Patented Mar. 15, 1932

1,849,577

UNITED STATES PATENT OFFICE

WALTER KARRER, OF BASEL, SWITZERLAND, ASSIGNOR TO HOFFMANN-LA ROCHE INC. OF NUTLEY, NEW JERSEY, A CORPORATION OF NEW JERSEY

PROCESS FOR THE MANUFACTURE OF DIFFICULTLY WATER-SOLUBLE GLUCOSIDE OF ADONIS VERNALIS

No Drawing. Application filed January 20, 1928, Serial No. 248,273, and in Germany April 1, 1927.

A very efficacious, water soluble glucoside of Adonis vernalis may be obtained by treating extracts of the drug with adsorbing agents, such as charcoal, extracting the glucoside from the adsorbing agent with a suitable solvent and further purifying the extract with water. The process is short and the product is obtained with a good yield and in great purity.

It has now been found that through an adsorbing agent another efficacious difficultly water-soluble glucoside may be extracted from the aqueous or alcoholic drug extracts. In treating the residue obtained by extracting the glucoside adsorbing agent with a suitable solvent and evaporating the solvent, with ether and water, a thick dark-brown oil is left undissolved. If this oil is again dissolved in a suitable solvent, for example chloroform and the solution is passed into a liquid which mixes with the solvent but in which the glucoside is insoluble, the difficultly water-soluble glucoside is precipitated as a light-brown powder. For further purification this product may be dissolved in dilute alcohol, and the solution treated in the usual manner with lead acetate and sodium phosphate. After the alcohol has been distilled off, the glucoside separated from the water is again dissolved with chloroform. From the purified glucoside solution thus obtained the glucoside is precipitated by the addition of petroleum ether. The glucoside is obtained as a slightly yellow powder, which has an efficacity of 200000 to 250000 frog units. In water it is very difficultly soluble, but easily soluble in chloroform and alcohol. It is insoluble in petroleum ether and ether. It shows acid properties in that it is easily soluble in alkali. After hydrolytic splitting with dilute mineral acid Fehling solution is reduced. In Keller's reaction the zone of contact of the glacial acetic acid with the sulphuric acid is marked by a brown coloured band; the glacial acetic acid obtains a beautiful blue colour. The easily soluble glucoside colours the glacial acetic acid slightly green and forms a red coloured band.

*Example*

1 part by weight of finely cut Herba adonis vernalis is extracted with 15 parts by weight of 40 per cent alcohol. After filtering and pressing out, the alcoholic extract is stirred with 0.5 parts by weight of adsorbing charcoal and the dried glucoside containing charcoal extracted with hot chloroform, which is then filtered off. When the chloroform is distilled off, there remains a thick brown oil, from which the easily soluble glucoside and the inactive fatty substances are removed by simultaneous treatment with approximately 0.05 parts water and 0.15 parts ether. The part of the oil left undissolved in the water and ether is dissolved in 0.03 parts of chloroform. After concentration, the chloroform solution is added, while stirring, to petroleum ether in the ratio of one part of the chloroform solution to five parts of the ether, whereby the glucoside is precipitated in solid form. For further purification the glucoside is dissolved in 50 per cent alcohol, and lead acetate is added to the solution until no further precipitation occurs. When the lead in excess has been removed with sodium phosphate, the purified alcoholic solution is separated from the alcohol in vacuo. The glucoside remains in form of an oil. By taking this oil up with chloroform and passing it through petroleum ether, a slightly yellow coloured, non-hygroscopic powder is obtained.

I claim:

1. As new article of manufacture a glucoside of Adonis vernalis forming a non-hygroscopic, yellowish powder which is very difficultly soluble in water, easily soluble in chloroform and alcohol, insoluble in ether and petroleum ether, said powder, owing to its acid properties, dissolving easily in alkali, Fehling solution being reduced after hydrolytic splitting with dilute mineral acid and in Keller's reaction the zone of contact of the glacial acetic acid with the sulphuric acid being marked by a brown coloured band, whereas the glacial acetic acid obtains a beautiful blue colour.

2. A process for the manufacture of difficultly water-soluble glucoside of Adonis vernalis, which consists in extracting raw materials containing glucosides of Adonis vernalis with aqueous alcohol, filtering off the extract, treating said extract with charcoal to adsorb the glucosides, extracting the glucosides from the charcoal with chloroform, filtering off the chloroform solution, separating said glucosides from the chloroform by evaporation, removing the easily soluble glucosides and inactive fatty substances by extraction with water and ether, dissolving the remaining glucosides in chloroform, and adding the chloroform solution to an excess of petroleum ether, whereby said difficultly water-soluble glucosides are precipitated.

3. A process for the production of a glucoside of Adonis vernalis comprising the steps of treating Herba adonis vernalis with aqueous alcohol, filtering the solution so formed, adding charcoal to the filtered solution to adsorb the glucoside therein, extracting the glucoside from the charcoal with chloroform, filtering off the chloroform from the charcoal, distilling off the chloroform to obtain a think brown oil, adding water and ether to the oil whereby fatty substances therein are dissolved by the ether and some of the glucoside is dissolved in the water, there remaining some glucoside difficultly soluble in water and insoluble in ether, separating this insoluble glucoside from the ether and water mixture, adding chloroform to ether, water insoluble glucoside, and precipitating the insoluble glucoside of the chloroform solution by adding the same to petroleum ether.

4. A process for the production of a glucoside of Adonis vernalis comprising the steps of treating Herba adonis vernalis with aqueous alcohol, filtering the solution so formed, adding charcoal to the filtered solution to adsorb the glucoside therein, extracting the glucoside from the charcoal with chloroform, filtering off the chloroform from the charcoal, distilling off the chloroform to obtain a thick brown oil, adding water and ether to the oil whereby fatty substances therein are dissolved by the ether and some of the glucoside is dissolved in the water, there remaining glucoside difficultly soluble in water and insoluble in ether, separating this insoluble glucoside from the ether and water mixture, adding chloroform to the ether, water insoluble glucoside, and precipitating the glucoside of the chloroform solution in solid form by adding the same to petroleum ether, removing the precipitated glucoside from the petroleum ether, purifying the solid glucoside by dissolving it in aqueous alcohol, adding lead acetate to the alcohol solution to precipitate impurities, removing the precipitate, removing the lead acetate in excess by treatment with sodium phosphate, separating the glucoside from the alcohol in the form of an oil, taking the oil up with chloroform and passing it through petroleum ether to obtain a powder.

5. In a process for extracting a glucoside from the plant Adonis vernalis in which a thick brown oil is obtained, said oil containing some glucoside soluble in water and some relatively insoluble therein, the steps of obtaining the difficult water soluble glucoside comprising adding water and ether to said oil, separating the glucoside not dissolved from the ether and water mixture, adding chloroform to the ether water insoluble glucoside, and precipitating the glucoside of the chloroform solution by adding the same to petroleum ether.

6. In a process for extracting a glucoside from the plant Adonis vernalis by which a thick brown oil is obtained, said oil containing some glucoside soluble in water and some relatively insoluble therein, the steps of obtaining the difficult water soluble glucoside comprising adding water and ether to said oil, separating the glucoside not dissolved therein from the ether and water mixture, adding chloroform to the ether water insoluble glucoside, precipitating the glucoside of the chloroform solution in a solid form by adding the same to petroleum ether, removing the precipitated glucoside from the petroleum ether, purifying the solid glucoside by dissolving it in aqueous alcohol, adding lead acetate to the alcohol solution to precipitate impurities, removing the precipitates, removing the lead acetate in excess by treatment with sodium phosphate, separating the glucoside from the alcohol in the form of an oil, and taking the oil up with chloroform and passing it through petroleum ether to obtain a powder.

In witness whereof I have hereunto set my hand.

WALTER KARRER.